US010050949B2

(12) United States Patent
Marcy et al.

(10) Patent No.: US 10,050,949 B2
(45) Date of Patent: Aug. 14, 2018

(54) ACCESSING A SECURE NETWORK USING A STREAMING DEVICE

(71) Applicant: Amazon Technologies, Inc., Seattle, WA (US)

(72) Inventors: Jordan Andrew Marcy, Palo Alto, CA (US); Rajan Ranga, Palo Alto, CA (US); He Chen, San Jose, CA (US); Ben Zion Gabay, Palo Alto, CA (US); Patricia Julia Cuadra, Cupertino, CA (US); Michael William Miller, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/666,078

(22) Filed: Mar. 23, 2015

(65) Prior Publication Data

US 2016/0285841 A1    Sep. 29, 2016

(51) Int. Cl.
*H04L 29/06*    (2006.01)
*G06F 21/60*    (2013.01)
*H04L 29/08*    (2006.01)
*G06F 17/30*    (2006.01)

(52) U.S. Cl.
CPC ............ *H04L 63/08* (2013.01); *G06F 21/606* (2013.01); *H04L 63/10* (2013.01); *H04L 65/4069* (2013.01); *G06F 17/30867* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2004/0239649 A1* | 12/2004 | Ludtke | G06F 3/04883 345/173 |
| 2008/0307358 A1* | 12/2008 | Hintermeister | G06F 3/048 715/821 |
| 2012/0212678 A1* | 8/2012 | Wang | H04N 21/42222 348/734 |

(Continued)

OTHER PUBLICATIONS

International Search Report and Written Opinion for International Application No. PCT/US16/023724 dated Jun. 13, 2016 (23 pgs.).

*Primary Examiner* — Eleni A Shiferaw
*Assistant Examiner* — Andrew J Steinle
(74) *Attorney, Agent, or Firm* — Eversheds Sutherland (US) LLP

(57) ABSTRACT

Web pages, such as a captive portal web page, may be rendered on an electronic display such as a display of a television that is removably coupled to a content streaming device. The web pages may be rendered using a customized user interface (UI) of a captive portal application executable on the content streaming device. The UI of the captive portal application may be customized for viewing at a longer distance than a typical distance between a user and a handheld mobile device. A computer-executable script may be embedded or otherwise associated with source code of a web page to cause a focus outline of a selectable UI element to be displayed more prominently when a user navigates to the selectable UI element using, for example, a remote control device configured to communicate with the content streaming device.

18 Claims, 10 Drawing Sheets

(56) References Cited

U.S. PATENT DOCUMENTS

| | | | |
|---|---|---|---|
| 2012/0266109 A1* | 10/2012 | Lim | G06F 3/04883 715/863 |
| 2013/0144729 A1* | 6/2013 | Jones | G06Q 30/0251 705/14.73 |
| 2014/0052810 A1* | 2/2014 | Osorio | G06F 15/167 709/213 |
| 2014/0090030 A1* | 3/2014 | Ong | G06F 17/30867 726/4 |
| 2014/0259147 A1* | 9/2014 | L'Heureux | H04L 63/02 726/14 |
| 2015/0170072 A1* | 6/2015 | Grant | G06Q 10/067 705/7.36 |
| 2015/0205496 A1* | 7/2015 | Lord | G06F 19/345 715/746 |
| 2015/0235411 A1* | 8/2015 | Tokuyoshi | G06T 15/205 345/426 |
| 2015/0347364 A1* | 12/2015 | Zhang | G06F 3/04842 715/802 |

* cited by examiner

ACCESSING A SECURE NETWORK USING A STREAMING DEVICE

BACKGROUND

As a result of increased mobile device use and the greater availability of wireless local area networks (LANs) in public locales, users are increasingly attempting to access the Internet from a variety of public places such as restaurants, hotels, or the like. In certain cases, a public LAN (e.g., a Wi-Fi hotspot) may be a secure network requiring a user device to be authenticated prior to permitting the user device to access the Internet through the LAN. In order to authenticate a user device, a secured public network may redirect a browser application to a landing page for receiving authentication credentials for the network.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
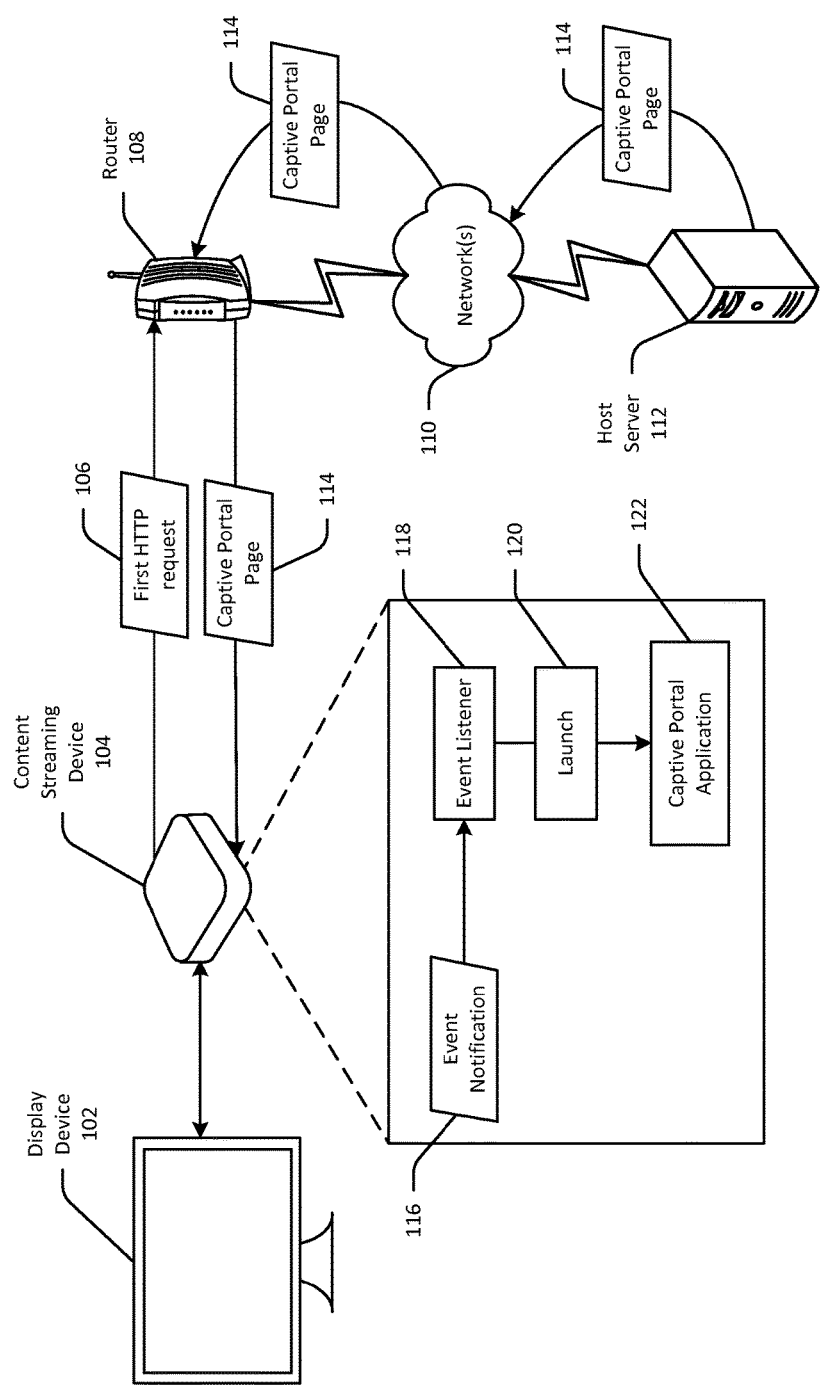
FIG. 1A is a schematic diagram illustrating a hypertext transfer protocol (HTTP) redirect to a captive portal page and the launching of a captive portal application on a content streaming device based on receipt of the captive portal page in accordance with one or more example embodiments of the disclosure.

This disclosure relates to, among other things, devices, systems, methods, computer-readable media, techniques, and methodologies for rendering web pages, such as a captive portal web page, on an electronic display operatively coupled to a content streaming device using a customized user interface (UI) of a captive portal application executable on the content streaming device. The UI of the captive portal application may be customized for viewing at a longer distance than a typical distance between a user and a handheld mobile device. For example, the UI of the captive portal application may be a graphical user interface (GUI) designed for viewing on large televisions and may include display elements (e.g., menus, buttons, text fonts) that are easily read from a relatively far distance, such as a distance of about 10 feet. This may be referred to as a "10 foot UI" or a "10 foot experience."

A secured wireless LAN (e.g., a secured Wi-Fi network) may be accessible at any of a variety of types of public locales. If a public Wi-Fi network is secured, a user device may need to be authenticated prior to being permitted to access the Internet via the secured Wi-Fi network. Typically, a user device, or more specifically, a browser application executing on the user device may be redirected to a captive portal page in response to a launch of the browser or in response to a user request to access a particular web page. Authentication credentials for accessing the secured network may be provided via the captive portal page. If the user device is successfully authenticated based on the authentication credentials, the user device may be permitted to access the secured Wi-Fi network, and thus, the Internet.

In accordance with certain example embodiments of the disclosure, a content streaming device may be removably coupled to a display device such as a television. The television may be provided at a public locale such as a hotel room. A secured wireless LAN (e.g., a secured Wi-Fi network) may be available for connection in the hotel room. The secured wireless LAN may utilize, for example, any of the Institute of Electrical Engineers (IEEE) 802.11 wireless communication protocols ("Wi-Fi"), Wi-Fi Direct, the Bluetooth™ wireless communication protocol, a Near Field Communication (NFC) protocol, or the like. The wireless LAN may be secured using any suitable encryption algorithms including, but not limited to, Wired Equivalent Privacy (WEP), Wi-Fi Protected Access (WPA), WPA2, or the like. If WEP is used, a 64-bit, 128-bit, 152-bit, or 256-bit WEP key may be used. WPA or WPA2 may utilize the Temporal Key Integrity Protocol (TKIP) according to which a new 128-bit key may be generated for each packet. A secured network (such as secured wireless LAN) may also include a network in which unencrypted communications are sent between user devices and an access point that does not require a password but that implements gateway security that enables only authenticated devices to access another network (e.g., the Internet) through the secured network. A device may be determined to be an authenticated device based on a cookie, Internet Protocol (IP) address, Media Access Control (MAC) address, or other identifier associated with the device. Further, a device may be determined to be an authenticated device based on data indicating that terms and conditions for using the access point as a gateway to other network(s) have been accepted.

The content streaming device may first establish a connection with the wireless network, which will be assumed to be a Wi-Fi network for explanatory purposes. For example, a user may select the network from a listing of wireless networks available for connection or the content streaming device may automatically establish the connection. The content streaming device may then generate an HTTP GET request for a particular web page that contains a known sequence of characters. The HTTP GET request may be received by a wireless router associated with the Wi-Fi network. The wireless router may determine that the content streaming device has not been authenticated on the network and may redirect the HTTP request to a host server hosting a captive portal page. The wireless router may receive the captive portal page from the host server and send the captive portal page to the content streaming device. The wireless router may determine that the content streaming device is unauthenticated based, for example, on an identifier associated with the device such as a Media Access Control (MAC) address of a network interface of the device. For example, the wireless router may compare the MAC address for the content streaming device to a set of MAC addresses associated with authenticated devices to determine that the MAC address for the content streaming device is not present in the set. In certain example embodiments, a time-to-live (TTL) value may be associated with each MAC address in the set indicating a duration of time for which a corresponding device is authenticated.

The content streaming device may determine that a captive portal page has been received by determining that the received resource does not include the known sequence of characters contained in the web page that was requested. Upon determining that a captive portal page has been received, the content streaming device may generate an event notification indicating that the captive portal page was received. An event listener may be provided on the content streaming device, perhaps as part of a captive portal application executable on the device. The event listener may be configured to listen for the event notification, and upon detection of the event notification by the listener, the captive portal application may be launched on the content streaming device.

The captive portal application may include or leverage a web view object or component for displaying web pages. For example, the captive portal application may instruct a rendering engine to render web pages within the web view object. The captive portal application may include a UI customized for viewing at longer distances (e.g., customized for display on a television display, computer monitor, or the like).

In certain example embodiments, upon launch, the captive portal application may generate a second HTTP request for a particular web page which may redirect to a default home page. This second HTTP GET request may be sent to the wireless router, and because the content streaming device is not yet authenticated on the captive portal network, the wireless router may redirect the content streaming device to the captive portal page. Specifically, the wireless router may redirect the second HTTP GET request to the host server hosting the captive portal page, receive the captive portal page from the host server, and send the captive portal page to the captive portal application executing on the content streaming device. This second HTTP GET request may be automatically generated to account for the possibility that the wireless router has "whitelisted" the default home page, and thus, to ensure that the captive portal page and not the default home page is received by the captive portal application from the wireless router.

Upon receipt of the captive portal page, the captive portal application may cause the captive portal page to be rendered using the web view object. More specifically, the captive portal application may instruct a rendering engine to render the captive portal page in the web view object. The captive portal page may include various selectable UI elements such as buttons, icons, menus, and so forth. Any UI element displayed on a rendered web page and which a user may interact with (select or navigate to) may be a selectable element. Each selectable UI element may be associated with a focus outline, which may be a boundary that is displayed around the selectable element or some other indicia that indicates that the selectable UI element is the UI element that is currently selected. A selectable UI element may also be referred to herein as a selectable element, a selectable object, a selectable UI object, or the like.

The focus outline for a selectable UI element may be rendered when the selectable UI element is navigated to. In certain example embodiments, the focus outline for a particular selectable UI element may be rendered upon rendering a web page, prior to any user interaction with the web page. This particular selectable UI element may be a default selectable element from which the user may navigate to other selectable UI elements on the web page. The original source code for a web page may specify a focus outline for a selectable UI element that is substantially imperceptible when rendered on an electronic display, in particular, a larger display such as a television screen. Accordingly, in certain example embodiments, the captive portal application may embed a computer-executable script (e.g., computer-executable code written in a dynamic programming language such as JavaScript™) in a web page to override the focus outline specified in the original source code of the web page and cause a more conspicuous focus outline to be rendered for each selectable UI element of the web page when selected. The computer-executable script may include any suitable computer-executable instructions, code, or the like.

In certain example embodiments of the disclosure, the script may be embedded in the source code for the captive portal page using the web view object. In particular, the web view object may include a function defined on its interface that receives the script as a parameter. More specifically, the script may be passed as an argument to the function as part of a call of the function that causes the script to be embedded in the source code for the captive portal page. The function may include any routine, subroutine, procedure, or the like that may cause a sequence or set of program instructions to be executed to cause the script to be embedded or otherwise associated with source code of a web page. As used herein, the term function encompasses a routine, subroutine, procedure, or any other sequence or set of program instructions that causes one or more operations to be performed when executed. While the script may be described herein as being embedded in the source code of a web page, it should be appreciated that the script may be an external script that is associated with the source code of a web page.

The script may be executed after or at least partially concurrently with rendering of the captive portal page in the web view object. As a result of execution of the script, when a particular selectable UI element is selected, a more conspicuous focus outline may be rendered for the selected UI element in lieu of a default focus outline for the selectable UI element. The more conspicuous focus outline may include a thicker boundary around the selectable UI element and/or may be a different color or shade from the default focus outline. It should be appreciated, however, that any suitable indicia may be rendered to make the focus outline more conspicuous.

As a user navigates among selectable UI elements of a web page (e.g., the captive portal page) rendered in the web view object, the focus outline that is rendered may change depending on which UI element is currently selected. For example, when a user navigates from a first selectable UI element to a second selectable UI element, the more conspicuous focus outline for the first UI element may no longer be rendered and the focus outline for the second UI element may be more prominently displayed. In this manner, the customer experience may be improved by displaying a more prominent focus outline for the selectable UI element that is currently selected.

A user may utilize a remote control device to interact with the content streaming device. For example, a user may utilize a remote control device to navigate between selectable elements on a rendered web page. The remote control device may be a physical standalone remote control having a physical button or touch interface. Alternatively, the remote control device may be a smartphone, tablet, or similar device having a remote control application executing thereon. The remote control device may communicate with the content streaming device using any suitable communication technology or protocol including, but not limited to, Bluetooth, NFC, Wi-Fi Direct, infrared (IR), or the like. The remote control device may include 5-way cursor controls to enable navigation in four orthogonal directions as well as to enable a selection action equivalent to a tap or click in a touch interface or click interface, respectively. The 5-way cursor controls may be a physical directional pad that includes four directional buttons and a center button or may be provided as part of a touch interface.

In certain example embodiments, when a user selects a particular button of the remote control device, a signal may be generated and communicated to the content streaming device. Upon receipt of the signal, the content streaming device may generate a first event indicative of a first device operation associated with the selected button. For example, for a selection of a right directional button, the first device operation may correspond to navigation in a direction to the right between UI representations of content items in a carousel. The captive portal application may intercept the first event and generate a second event corresponding to a second device operation that is different from the first device operation. For example, for the selection of the right directional button, the second device operation may correspond to navigating from a first selectable UI element on a web page to a second selectable UI element positioned laterally to the right of the first UI element. Similarly, the captive portal application may intercept each event that is generated when a particular button of the remote control device is selected and generate a new event corresponding to an operation to be performed on a rendered web page. For example, the captive portal application may associate a rewind button on the remote control device with a function for going back to a previous web page that was loaded, may associate a fast forward button with a function for going forward to a next web page that was loaded, may associate a play/pause button with a function for refreshing or reloading a web page, may associate a center button of 5-way cursor controls with a selection of a button or icon on a web page (equivalent to a tap or click in a touch or click interface), and so forth. Intercepting an event may include passing the event as a parameter to a function and making a call to the function to cause a default device operation associated with the event to not be performed.

In certain example embodiments, navigation between selectable UI elements may be impaired. For example, certain UI elements, although selectable, may not be associated with focus outlines. As another example, a web page designed for display on a touch-screen device may not render focus outlines for certain UI elements because doing so may impair the look and feel or functionality of the web page. As yet another example, even though a focus outline may be associated with a selectable UI element on a web page, when a user attempts to select the UI element, the web page may intercept the event and cause unexpected functionality to occur.

Accordingly, in certain example embodiments, a backup navigation mechanism may be provided in which a graphical indicator (e.g., a cursor) may be rendered on the electronic display in association with the web page. The cursor may be controlled via the four directional buttons of the 5-way controls of a remote control device. In particular, when a user selects a particular directional button (e.g., the right button), a signal may be generated by the remote control device and sent to the content streaming device. The content streaming device may generate a first event corresponding to a standard device operation associated with selection of the right directional button. The captive portal application may intercept the first event and generate a second event corresponding to movement of the cursor in a direction to the right on the display. In certain example embodiments, movement of the cursor may be accelerated if the user holds down the directional button. More specifically, the captive portal application may instruct the rendering engine to continuously render the cursor at a particular rate for the duration of receipt of the signal. The cursor may be rendered at a plurality of additional locations on the screen in a direction corresponding to a direction associated with the directional button that was selected. The captive portal application may automatically switch between the focus outline-based navigation mode and the back-up cursor navigation mode based on the web page that is being rendered. Additionally, or alternatively, a user may toggle between these modes by selecting a particular button on the remote control device (e.g., the menu button). Scrolling may also be enabled in the cursor navigation mode by causing the cursor to move to the edges of the rendered web page.

In certain example embodiments, user authentication credentials may be received via the captive portal page. Upon entry of the user authentication credentials and user selection of a particular UI element (e.g., a login button), the captive portal application may generate and send an authentication request that includes the authentication credentials to the wireless router. The wireless router may route the authentication request to a host server. The host server may send an authentication response to the wireless router, which may route the response to the content streaming device. In certain example embodiments, the authentication response may include a landing page that indicates that the content streaming device has been successfully authenticated based on the authentication credentials. In other example embodiments, the authentication response may include a message indicating that the content streaming device could not be successfully authenticated. In still other example embodiments, the wireless router may itself determine whether the content streaming device can be authenticated based on the authentication credentials and may generate and send a message to the content streaming device indicating successful or failed authentication.

In certain example embodiments, the content streaming device (e.g., the captive portal application) may generate an HTTP GET request for the web page containing the sequence of known characters in order to confirm that the device has been successfully authenticated. The content streaming device may send the HTTP GET request to the wireless router which may return a web resource to the content streaming device. The content streaming device may then determine whether the web resource received from the wireless router contains the sequence of known characters. If so, the content streaming device may determine that the requested web page was received and that the content streaming device has been successfully authenticated. The content streaming device may then exit out of the captive portal application and a default home screen of the content streaming device may be rendered on the electronic display. If the returned resource does not include the known sequence of characters, then the captive portal application may be maintained to permit subsequent authentication attempts.

Example embodiments of the disclosure provide a number of technical features or technical effects. For example, in accordance with example embodiments of the disclosure, web pages, such as a captive portal page, may be rendered in a web view object using a captive portal application UI that is customized for presentation on displays that are larger than displays typically associated with handheld mobile devices. In addition, an executable script may be embedded or otherwise associated with source code of a web page and may be executed after or at least partially concurrently with the loading of the web page to cause an override of a default focus outline associated with a selectable UI element and a more prominent focus outline to be displayed when the UI element is selected. In this manner, navigation between selectable UI elements may be optimized for the customized UI. In addition, events generated as a result of selection of controls or buttons on a remote control device may be intercepted and new events may be generated corresponding to different device functions associated with navigation on a display that does not have a touch-based or click-based interface. It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Data Flows and Processes

Figure 1B:
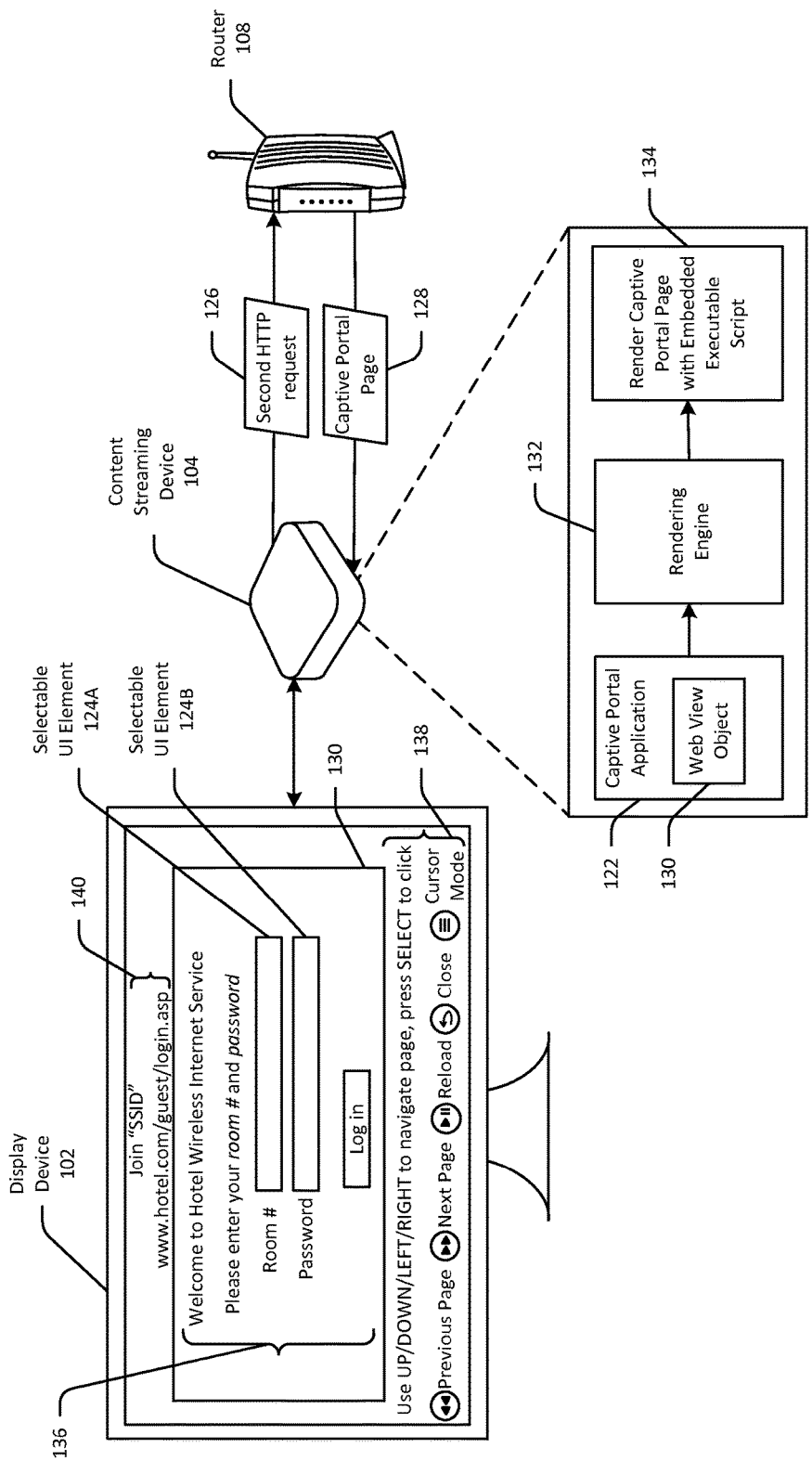
FIG. 1B is a schematic diagram illustrating the rendering, by a captive portal application, of a captive portal page on an electronic display using a customized user interface in accordance with one or more example embodiments of the disclosure.
Figure 5:
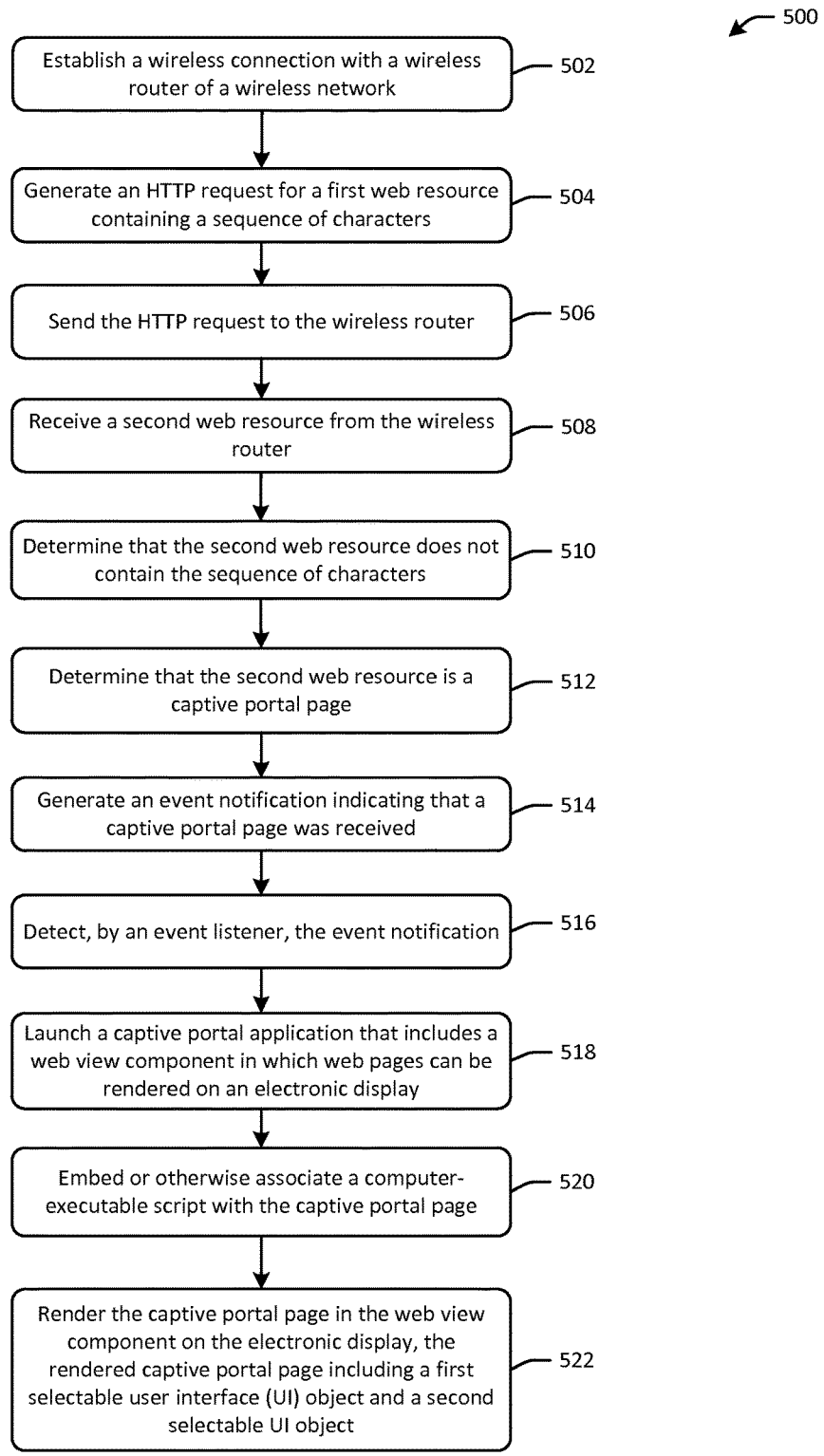
FIG. 5 is a process flow diagram of an illustrative method for receiving a captive portal page via an HTTP redirect and launching a captive portal application on a content streaming device based on receipt of the captive portal page in accordance with one or more example embodiments of the disclosure.

FIG. 1A is a schematic diagram illustrating a hypertext transfer protocol (HTTP) redirect to a captive portal page and the launching of a captive portal application on a content streaming device based on receipt of the captive portal page in accordance with one or more example embodiments of the disclosure. FIG. 1B is a schematic diagram illustrating the rendering, by a captive portal application, of a captive portal page on an electronic display using a customized user interface in accordance with one or more example embodiments of the disclosure. FIG. 5 is a process flow diagram of an illustrative method 500 for receiving a captive portal page via an HTTP redirect and launching a captive portal application on a content streaming device based on receipt of the captive portal page in accordance with one or more example embodiments of the disclosure. FIGS. 1A-1B and 5 will be described hereinafter in conjunction with one another.

As shown in FIG. 1A, a content streaming device 104 may be communicatively coupled to a display device 102. For example, the content streaming device 104 may be removably coupled to the display device 102. The display device may be a television, a computer monitor, or any other suitable display device. In certain example embodiments, the display of the display device may be significantly larger in size than the typical display size of a handheld mobile device such as a smartphone or tablet. The content streaming device 104 may be connected to the display device 102 via any suitable interface such as, for example, a Universal Serial Bus (USB) interface, a High-Definition Multimedia Interface (HDMI), or the like.

The display device 102 and the content streaming device 104 may be located in a public locale at which a secured wireless LAN (e.g., a secured Wi-Fi network) may be accessible. The secured Wi-Fi network may require the content streaming device 104 to be authenticated prior to permitting the content streaming device 104 to access the Internet via the secured Wi-Fi network. A wireless router 108 may support the secured Wi-Fi network. The wireless router 108 may communicate with a host server 112 via one or more network(s) 110. The wireless router 108 may also communicate with any number of web servers via the network(s) 110. Upon successful authentication with the secured Wi-Fi network, the content streaming device 104 may access the network(s) 110 via the wireless router 108.

The network(s) 110 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 110 may have any suitable communication range associated therewith and may include, for example, global networks (e.g., the Internet), metropolitan area networks (MANs), wide area networks (WANs), local area networks (LANs), or personal area networks (PANs). In addition, the network(s) 110 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

Referring now to FIGS. 1A and 5 in conjunction with one another, at block 502, the content streaming device 104 may establish a connection with the wireless router 108. For example, a user may select a service set identifier (SSID) corresponding to the wireless LAN supported by the wireless router 108 from a list of SSIDs corresponding to available wireless networks. Alternatively, the content streaming device 104 may automatically establish the connection with the wireless router 108. At block 504, the content streaming device 104 may generate an HTTP request 106 for a first web resource containing a known sequence of characters. At block 506, the content streaming device 104 may send the HTTP request 106 to a wireless router 108 associated with the secured Wi-Fi network. The wireless router 108 may determine that the content streaming device 104 has not been authenticated on the network. The wireless router 108 may determine that the content streaming device 104 is unauthenticated based, for example, on an identifier associated with the device 104 such as a MAC address of a network interface of the device 104. For example, the wireless router 108 may compare the MAC address for the content streaming device 104 to a set of MAC addresses associated with authenticated devices to determine that the MAC address for the content streaming device 104 is not present in the set. Upon determining that the content streaming device 104 has not been authenticated, the wireless router 108 may redirect the HTTP request 106 to a host server 112 hosting a captive portal page 114. The wireless router 108 may receive the captive portal page 114 from the host server 112 and send the captive portal page 114 to the content streaming device 104. The content streaming device 104 may receive the captive portal page 114 at block 508.

In particular, the content streaming device 104 may receive a second web resource from the wireless router 108 at block 508. At block 510, the content streaming device 104 may determine that the second web resource does not contain the known sequence of characters, and thus, may determine, at block 512, that the second web resource is not the requested first web resource and is instead the captive portal page 114.

Upon determining that the captive portal page 114 has been received, the content streaming device 104 may generate an event notification 116 at block 514 indicating that the captive portal page 114 was received. An event listener 118 may be provided on the content streaming device 104, perhaps as part of a captive portal application 122 executable on the device 104. The event listener 118 may be configured to listen for the event notification 116, and may detect the event notification at block 516. Upon detection of the event notification 116 by the listener 118, the captive portal application 122 may be launched on the content streaming device 104 at block 518. More specifically, the event listener 118 may define an interface that includes a function that may be called when the event notification 116 is detected. Calling this function may cause the captive portal application 122 to be launched.

Referring now to FIGS. 1B and 5 in conjunction with one another, the captive portal application 122 may include or leverage a web view object or component 130 for displaying web pages. For example, the captive portal application 122 may instruct a rendering engine 132 to render web pages within the web view object 130. The captive portal application 122 may include a UI customized for viewing at longer distances (e.g., customized for display on the display device 102).

In certain example embodiments, upon launch, the captive portal application 122 may generate a second HTTP request 126 for a particular web page which may redirect to a default home page. This second HTTP GET request 126 may be sent to the wireless router 108, and because the content streaming device 104 is not yet authenticated on the captive portal network, the wireless router 108 may redirect the second HTTP GET request 106 to the captive portal page 128. Specifically, although not depicted in FIG. 1B, the wireless router 108 may redirect the second HTTP GET request 126 to the host server 112 hosting the captive portal page 128, receive the captive portal page 128 from the host server 112, and send the captive portal page 128 to the captive portal application 122 executing on the content streaming device 104. This second HTTP GET request 126 may be generated to account for the possibility that the wireless router 108 has "whitelisted" the default home page, and thus, to ensure that the captive portal page 128 and not the default home page is received by the captive portal application 122 from the wireless router 108. In certain example embodiments, the captive portal page 128 may correspond to a second instance of receipt of the captive portal page from the wireless router 108.

Upon receipt of the captive portal page 128, the captive portal application 122 may, at block 520, embed or otherwise associate a computer-executable script (e.g., computer-executable code written in a dynamic programming language such as JavaScript™) with the captive portal page 128. In particular, source code of the captive portal page 128 may have the executable script embedded or injected therein or the executable script may otherwise be associated with the source code of the captive portal page 128. For example, a flag, index, tag, or other identifier may be used to locate a selectable UI element in the source code of the captive portal page 128. The executable script may then be embedded in the source code and may be executed along with a rendering of the captive portal page content embodied in the source code of the captive portal page 128. More specifically, the executable script may be executed after or during rendering of the captive portal page 128 and may cause the focus outline specified in the original source code of the captive portal page 128 to be overridden and a more conspicuous focus outline to be rendered for each selectable UI element 124 of the captive portal page 128 when that UI element is selected or otherwise navigated to from another selectable UI element. The computer-executable script may include any suitable computer-executable instructions, code, or the like. In certain example embodiments, the computer-executable script may include computer-executable code written in a style sheet language (e.g., Cascading Style Sheets (CSS)) that allows for separating document content from document presentation. In particular, execution of the computer-executable script may include executing CSS code to cause a style object to be generated for each selectable UI element of the captive portal page 128. The style object may be representative of the more conspicuous focus outline to be rendered when the selectable UI element is currently selected UI element.

At block 522, the rendering engine 132 may render the captive portal page 128 in the web view object 130 on a display of the display device 102. More specifically, the captive portal application 122 may instruct the rendering engine 132 to render 134 the captive portal page 128 in the web view object 130. The rendered captive portal page 128 may include a first selectable UI element 124A and a second selectable UI element 124B. The selectable UI elements labeled 124A, 124B are merely illustrative. It should be appreciated that any number of selectable UI elements may be rendered as part of the rendered captive portal page 128.

In particular, the captive portal page 128 may include various selectable UI elements such as buttons, icons, menus, and so forth. Any UI element displayed as part of the captive portal page 128 and which a user may interact with (select or navigate to) may be a selectable element. Each selectable UI element on the captive portal page 128 may be associated with a focus outline, which may be a boundary that is displayed around the selectable element or some other indicia that indicates that the selectable UI element is the UI element that is currently selected or that represents a current navigation resting point. The focus outline for a selectable UI element may be rendered when the selectable UI element is navigated to. In certain example embodiments, the focus outline for a particular selectable UI element may be rendered upon rendering a web page, prior to any user interaction with the web page. This particular selectable UI element may be a default selectable element from which the user may navigate to other selectable UI elements on the web page.

The original source code for a web page may specify a focus outline for a selectable UI element that is substantially imperceptible when rendered on an electronic display, in particular, a larger display such as a television screen. As such, execution of the script embedded in or otherwise associated with the source code of the captive portal page 128 may cause a more conspicuous focus outline to be displayed for a selectable UI element when the UI element is selected or otherwise navigated to. As an example, when a particular selectable UI element is selected, the more conspicuous focus outline may be rendered for the selected UI element in lieu of a default focus outline specified for the selected UI element in the source code for the captive portal page 128. The more conspicuous focus outline may include a thicker boundary around the selectable UI element and/or may be a different color or shade from the default focus outline. A greater number of pixels of the display of the display device 102 may be used to render the thicker boundary associated with the more conspicuous focus outline. It should be appreciated, however, that any suitable indicia may be rendered to make the focus outline more conspicuous.

As previously noted, source code of the captive portal page 128 may be used to render website content 136 of the captive portal page 128 in the web view object 130 on a display of the display device 102. Content displayed in the web view object 130 may change depending on the web page that is rendered in the web view object 130. For example, a different captive portal page (e.g., with different content, UI objects, and/or arrangement of content and UI objects) may be rendered in the web view object 130 if the content streaming device 104 establishes a connection with a different captive portal network. Further, once the content streaming device 104 is authenticated with the wireless router 108, website content from any number of web pages may be rendered in the web view object 130. In addition, static content 138 may be rendered on the display of the display device 102. The static content 138 may be, for example, a native O/S text element that displays the device functions associated with various remote control buttons when a web page is rendered in the web view object 130. For example, the static content 138 may indicate that the left directional button may be used to load a previous web page, the right directional button may be used to load a next web page, the play/pause button may be used to refresh or reload a web page, the back button may be used to close the captive portal application 122, the menu button may be used to toggle between different navigation modes, and so forth. The content 138 may be displayed as long as the captive portal application is executing and may remain static as different web pages are accessed and rendered in the web view object 130. The content 138 may be rendered on the display of the display device 102 but outside of the web view object 130. In addition, other dynamic content 140 may be rendered outside of the web view object 130. The content 140 may be dynamic in the sense that it may vary depending on the wireless network that is being accessed. For example, the SSID and the uniform resource locator (URL) of the captive portal page may vary depending on the wireless network being accessed.

Figure 2A:
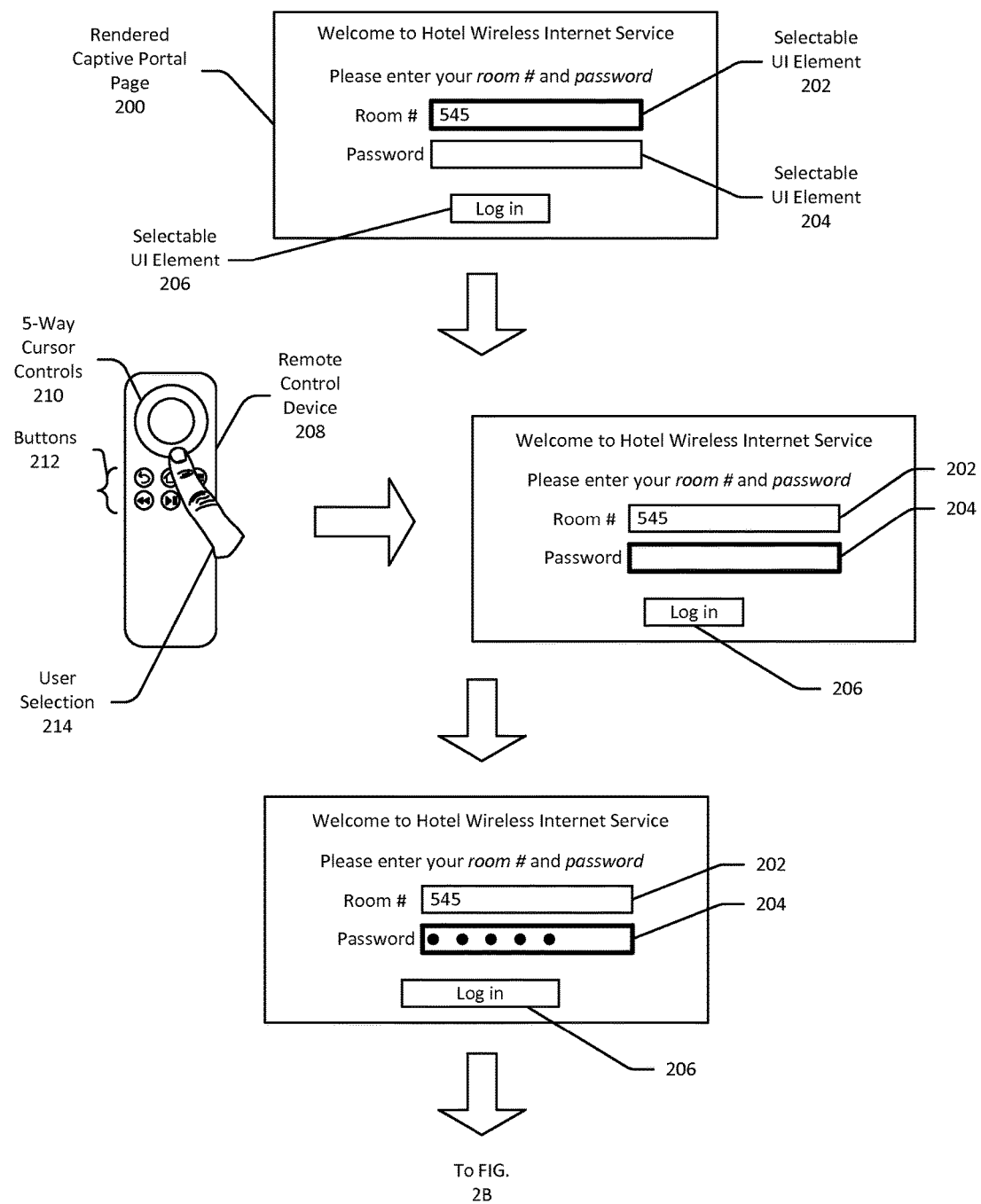
FIGS. 2A-2B depict example user interfaces illustrating navigation between various selectable elements of a rendered captive portal page in accordance with one or more example embodiments of the disclosure.
Figure 2B:
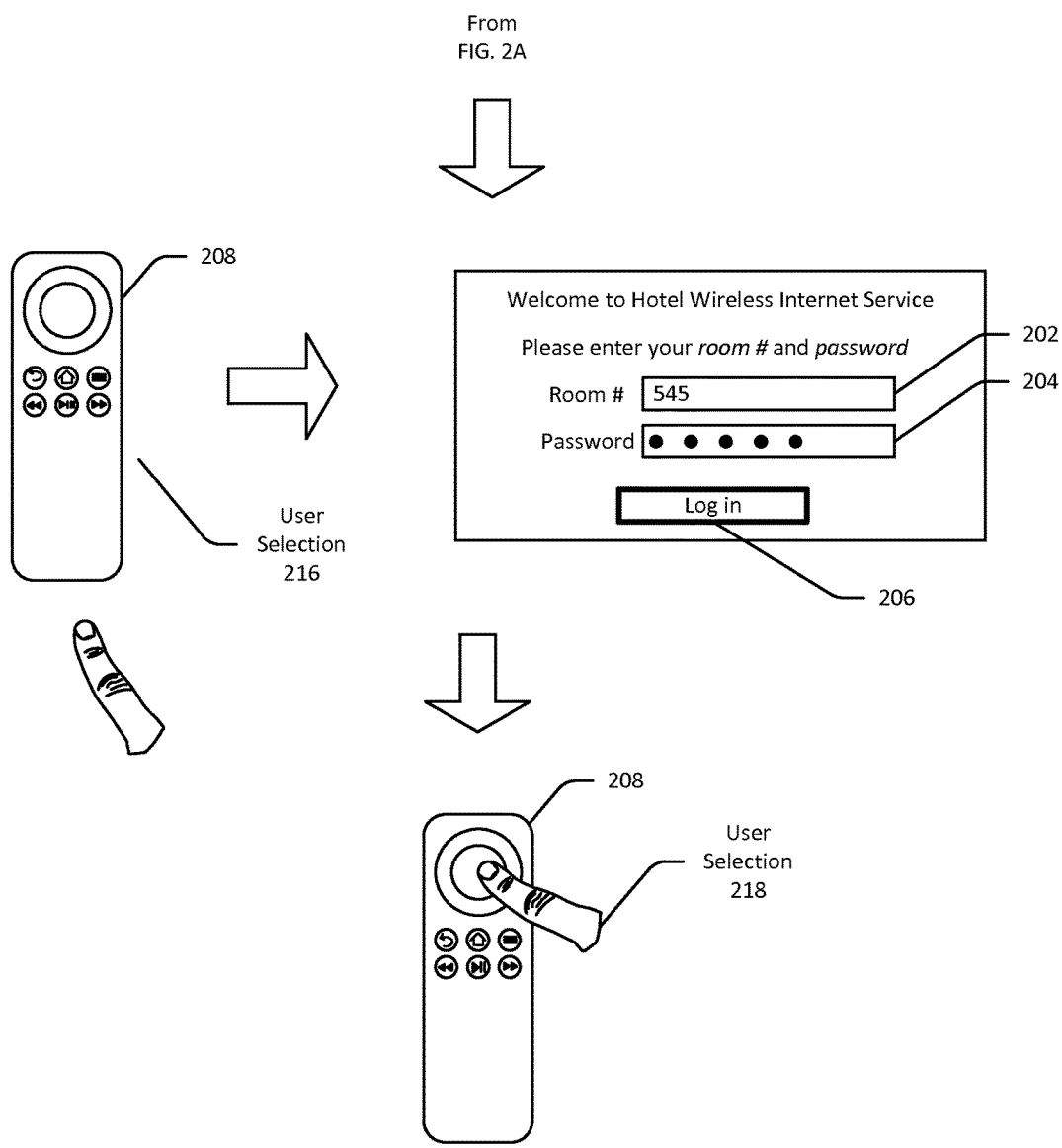
Figure 6:
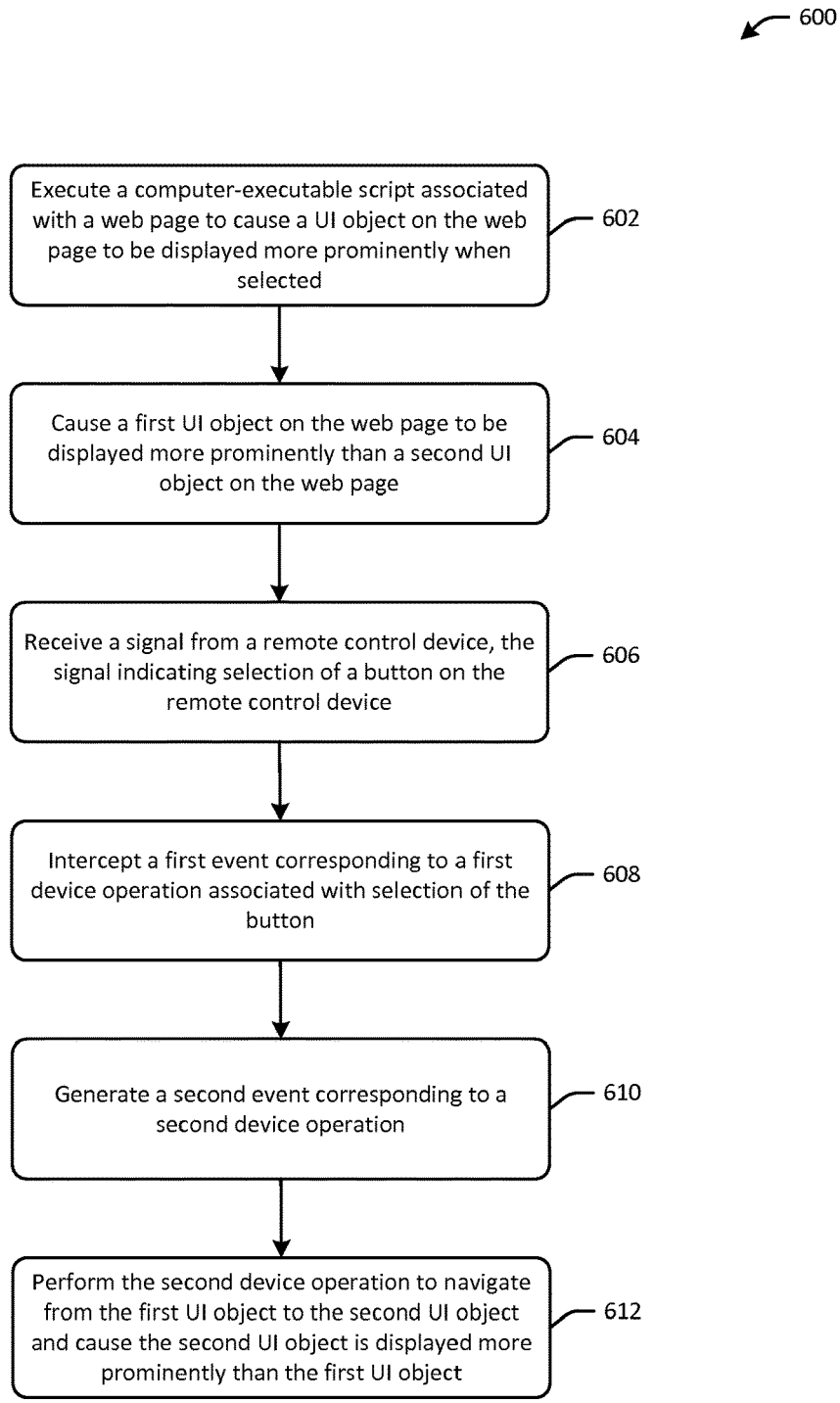
FIG. 6 is a process flow diagram of an illustrative method for navigating between selectable elements of a rendered captive portal page in accordance with one or more example embodiments of the disclosure.

FIGS. 2A-2B depict example user interfaces illustrating navigation between various selectable elements of a rendered captive portal page in accordance with one or more example embodiments of the disclosure. FIG. 6 is a process flow diagram of an illustrative method 600 for navigating between selectable elements of a rendered captive portal page in accordance with one or more example embodiments of the disclosure. FIGS. 2A-2B and 6 will be described in conjunction with one another hereinafter.

At block 602, the captive portal application 122 may execute a computer-executable script after or at least partially concurrently with rendering of the captive portal page 200. The script may be injected, embedded, or otherwise associated with source code of the captive portal page 200. Execution of the script may cause any selectable UI element of the captive portal page 200 to be displayed more prominently when that UI element is selected. In particular, at block 604, as a result of execution of the script, a first selectable UI element 202 may be displayed more prominently than a second selectable UI element 204 on the rendered captive portal page 200 when the first UI element 202 is selected or otherwise represents a current UI element from which other UI elements may be navigated to. More specifically, as a result of execution of the script, a more conspicuous focus outline may be rendered in association with the first selectable UI element 202 when the first UI element 202 is selected or otherwise navigated to. The captive portal page 200 may correspond to the captive portal pages 114 and/or 128.

The first selectable UI element 202 may correspond to a character entry field for inputting a portion of authentication credentials such as, for example, a username, a hotel room number, or any other suitable user identifier. In certain example embodiments, the focus outline for the first selectable UI element 202 may be rendered upon rendering the captive portal page 200, prior to any user interaction with the page 200.

As previously noted, in certain example embodiments, a user may utilize a remote control device 208 to interact with the content streaming device 104. For example, a user may utilize the remote control device 208 to navigate between various selectable elements on the page 200. The remote control device 208 may be a physical standalone remote control having a physical button or touch interface. Alternatively, the remote control device 208 may be a smartphone, tablet, or similar device having a remote control application executing thereon. The remote control device 208 may communicate with the content streaming device 104 using any suitable communication technology or protocol as described previously.

The remote control device 208 may include 5-way cursor controls 210 to enable navigation in four orthogonal directions as well as a selection button that responsive to selection causes an action equivalent to a tap or click in a touch interface or click interface, respectively, to occur. The 5-way cursor controls 210 may be a physical directional pad and button or may be provided as part of a touch interface. The remote control device 208 may further include various buttons 212 associated with various other device functions or operations. The operation or function performed responsive to selection of a cursor control 210 or a button 212 may be different for the rendered captive portal page 200 as compared to when a different UI is rendered (e.g., a default home screen of the content streaming device 104).

Upon inputting the user identifier in the character entry field of the first selectable UI element 202, a user may select 214 a particular button of the remote control device 208. For example, the user may select 214 the down directional button of the 5-way cursor controls 210. The remote control device 208 may generate a signal in response to the user selection 214 and communicate the signal to the content streaming device 104. The content streaming device 104 may receive the signal at block 606.

Upon receipt of the signal, the content streaming device 104 may generate a first event indicative of a first device operation associated with the selected button. For example, for selection of a down directional button, the first device operation may typically correspond to navigation in a downward direction between UI representations of content items in a content carousel. At block 608, the captive portal application 122 may intercept the first event. At block 610, the captive portal application 122 may generate a second event corresponding to a second device operation that is different from the first device operation. For example, for the selection of the down directional button, the second device operation may correspond to navigating from the first selectable UI element 202 to a second selectable UI element 204 rendered below the first UI element 202.

Similarly, the captive portal application 122 may intercept each event that is generated when a particular button or control of the remote control device 208 is selected and generate a new event corresponding to an operation to be performed on the captive portal page 200. For example, the captive portal application 122 may associate a rewind button 212 on the remote control device 208 with a function for going back to a previous web page that was loaded, may associate a fast forward button 212 with a function for going forward to a next web page that was loaded, may associate a play/pause button 212 with a function for refreshing or reloading a web page, may associate a center button of the 5-way cursor controls 210 with a selection of a button or icon rendered as part of a web page (e.g., the captive portal page 200), and so forth. In this manner, selection of the center button of the 5-way cursor controls 210 may be treated as being equivalent to a tap or click in a touch or click interface, respectively.

At block 612, the captive portal application 122 may perform the second device operation corresponding to the second event. The second device operation may include navigating from the first UI element 202 to the second UI element 204. As previously noted, as a user navigates among selectable UI elements of a web page (e.g., the captive portal page 200) rendered in the web view object 130, the focus outline that is rendered may change depending on which UI element is currently selected. For example, when a user navigates from the first selectable UI element 202 to the second selectable UI element 204, the more conspicuous focus outline for the first UI element 202 may no longer be rendered and the more prominent focus outline for the second UI element 204 may be displayed instead.

The second selectable UI element 204 may include a character entry field for inputting an additional portion of the user authentication credentials. For example, a user may input characters corresponding to a password in the character entry field of the second selectable UI element 204. The remote control device 208 may be used for character entry. For example, upon selection of an appropriate button 212, a virtual keyboard UI may be surfaced as an overlay over the rendered captive portal page 200 to enable character entry. In certain example embodiments, the web view object 130 may be configured to surface a virtual keyboard that is customized for the content streaming device 104.

Referring now to FIG. 2B, upon entry of a password, the user may once again select 216 the down directional button on the remote control device 208. A process similar to that described above may then be performed to navigate from the second UI element 204 to a third UI element 206. In connection with navigation from the second selectable UI element 204 to the third selectable UI element 206, the more conspicuous focus outline for the second UI element 204 may no longer be rendered and the focus outline for the third UI element 206 may be more prominently displayed. The user may then make an additional selection 218 on the remote control device 208 (e.g., a selection of the center button of the 5-way cursor controls 210) to generate the equivalent of a tap or click event with respect the selectable UI element 206. This may then initiate an authentication process that will be described in more detail hereinafter in reference to FIGS. 3 and 7.

Figure 3:
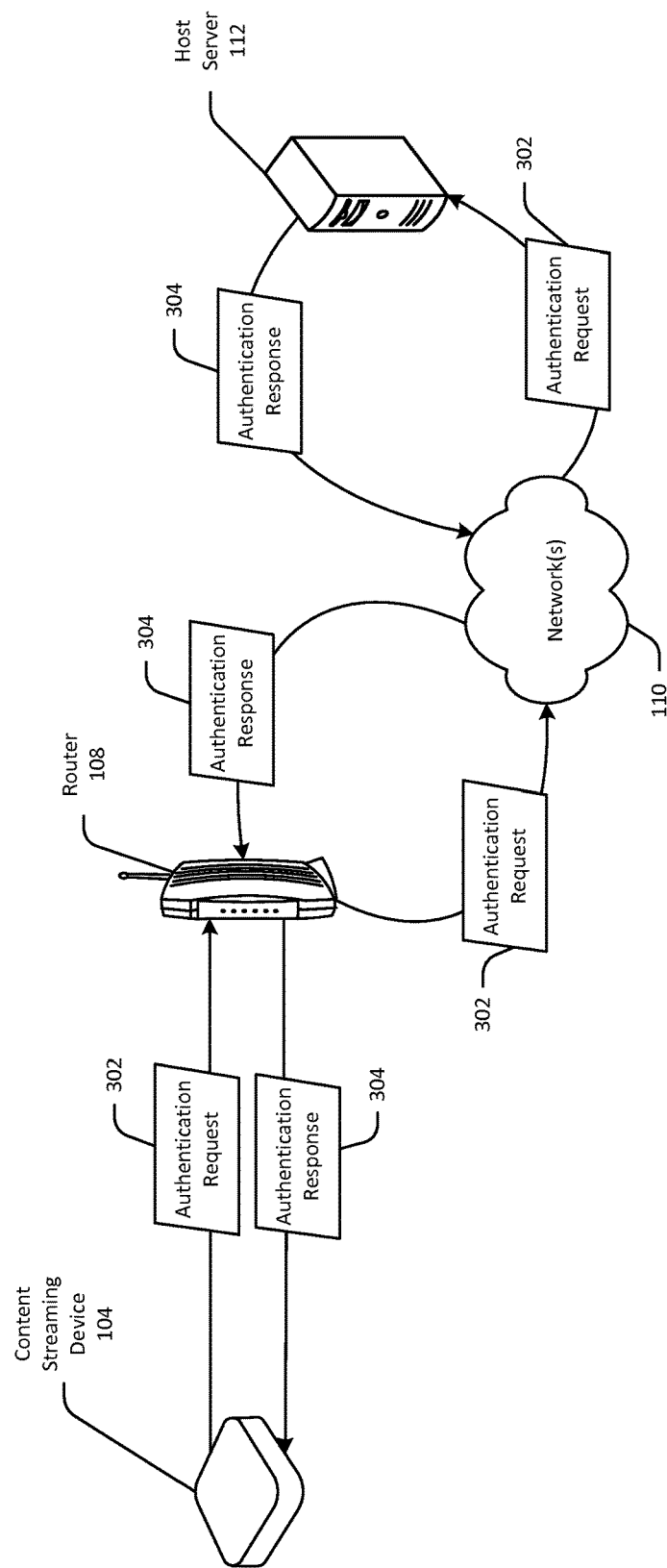
FIG. 3 is a schematic diagram illustrating a request-response mechanism for authenticating a content streaming device based on user authentication credentials received via a captive portal page in accordance with one or more example embodiments of the disclosure.
Figure 4:
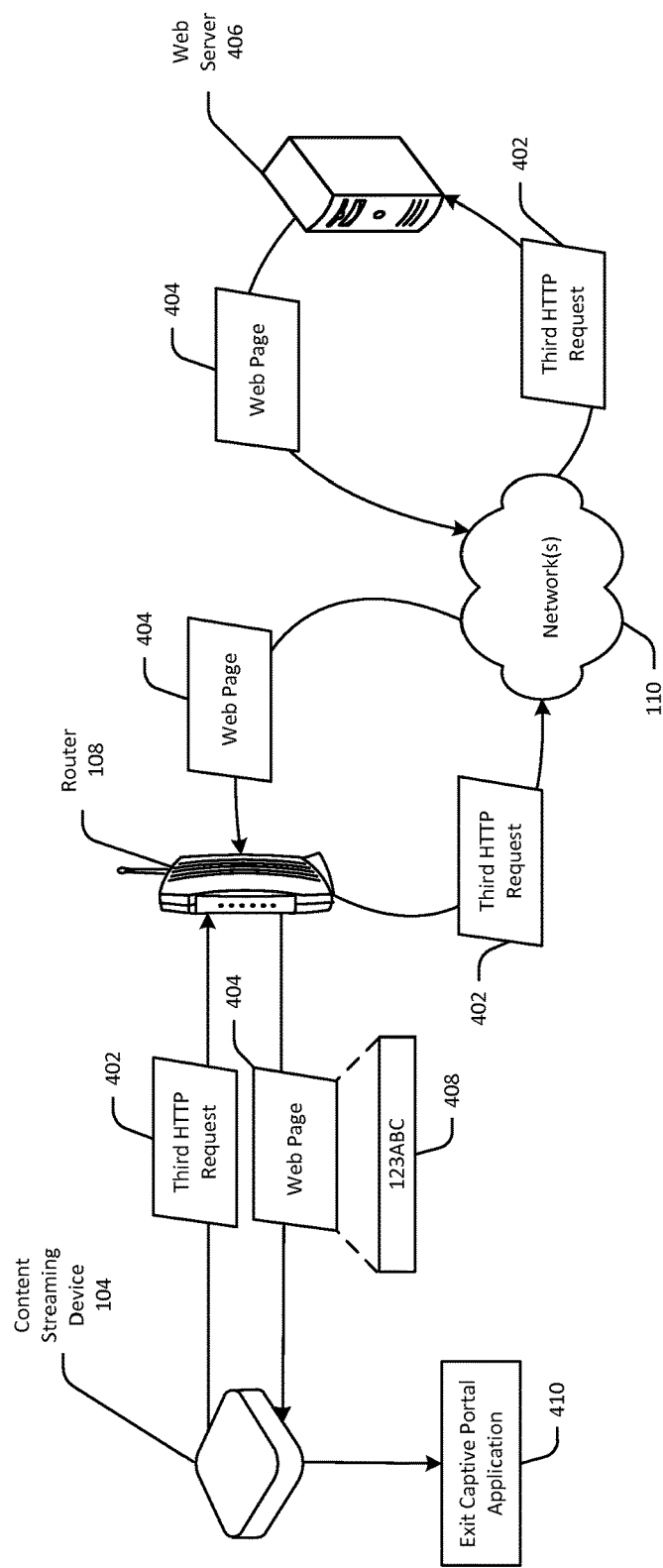
FIG. 4 is a schematic diagram illustrating a request-response mechanism for confirming that a network connection has been successfully established and exiting a captive portal application in accordance with one or more example embodiments of the disclosure.
Figure 7:
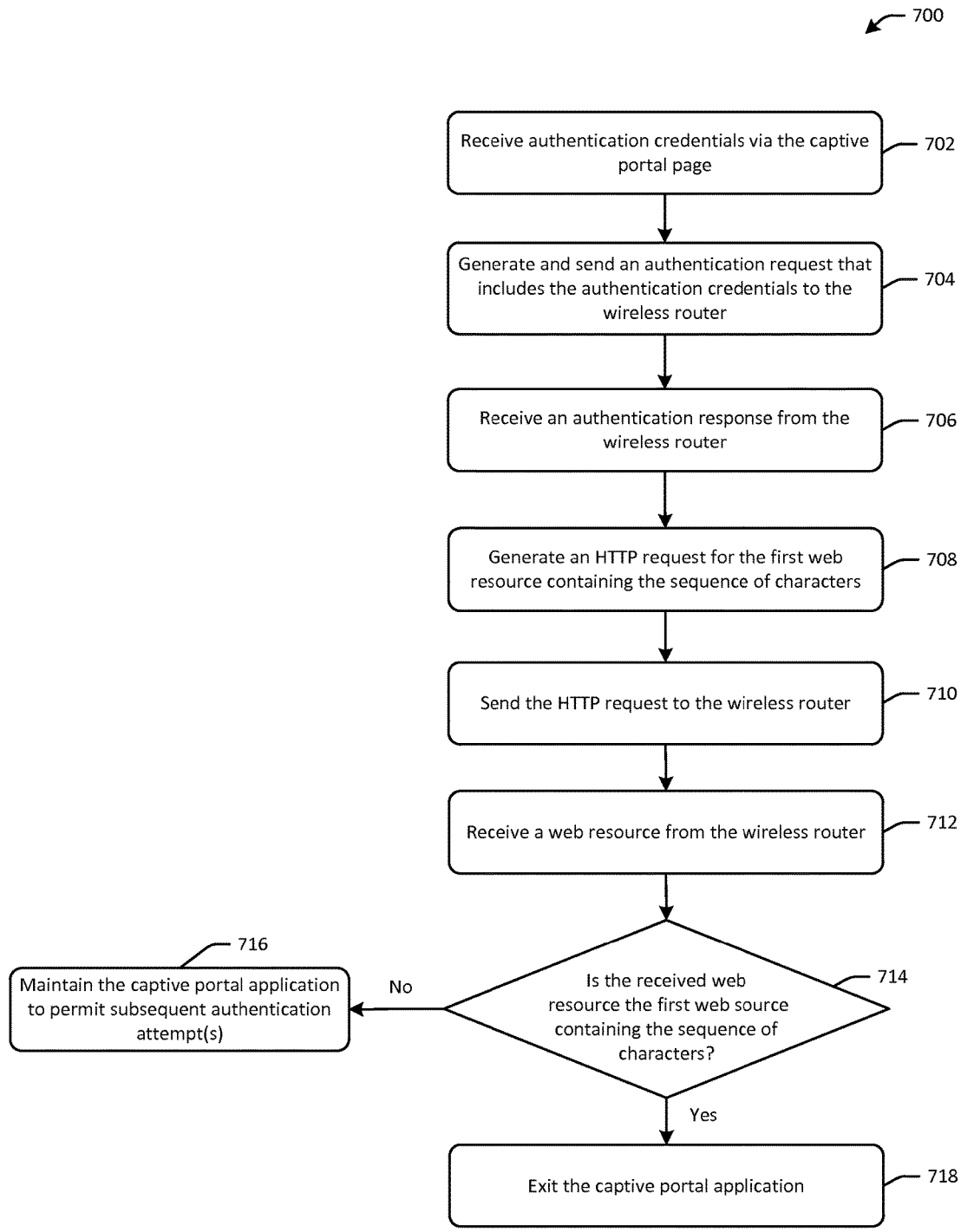
FIG. 7 is a process flow diagram of an illustrative method for authenticating a content streaming device based on user authentication credentials received via a captive portal page, confirming that a network connection has been successfully established, and exiting a captive portal application in accordance with one or more example embodiments of the disclosure.

FIG. 3 is a schematic diagram illustrating a request-response mechanism for authenticating a content streaming device based on user authentication credentials received via a captive portal page in accordance with one or more example embodiments of the disclosure. FIG. 4 is a schematic diagram illustrating a request-response mechanism for confirming that a network connection has been successfully established and exiting a captive portal application in accordance with one or more example embodiments of the disclosure. FIG. 7 is a process flow diagram of an illustrative method 700 for authenticating a content streaming device based on user authentication credentials received via a captive portal page and confirming that a network connection has been successfully established and exiting a captive portal application in accordance with one or more example embodiments of the disclosure. FIGS. 3, 4, and 7 will be described in conjunction with one another hereinafter. While example operations of FIG. 7 may be described hereinafter as being performed by the content streaming device 104 generally, it should be appreciated that the captive portal application 122 and/or one or more other device components may perform any of the operations.

At block 702, user authentication credentials may be received via, for example, the illustrative process described in reference to FIGS. 2A-2B and 6. Referring now to FIGS. 3 and 7 together, at block 704, the content streaming device 104 may generate an authentication request 302 that includes the received authentication credentials and may send the authentication request 302 to the wireless router 108. The wireless router 108 may route the authentication request 302 to the host server 112. The host server 112 may send an authentication response 304 to the wireless router 108, which may route the response 304 to the content streaming device 104. The content streaming device 104 may receive the authentication response 304 at block 706. In certain example embodiments, the authentication response 304 may include a landing page that indicates that the content streaming device 104 has been successfully authenticated based on the authentication credentials. In other example embodiments, the authentication response 304 may include a message indicating that the content streaming device could not be successfully authenticated. In still other example embodiments, the wireless router 108 may itself determine whether the content streaming device 104 can be authenticated based on the authentication credentials and may generate and send a message to the content streaming device 104 indicating successful or failed authentication.

Referring now to FIG. 4 and FIG. 7 together, upon being successfully authenticated, the content streaming device 104 may, at block 708, generate an HTTP GET request 402 for the web page containing the sequence of known characters in order to confirm that the device 104 has been successfully authenticated. At block 710, the content streaming device 104 may send the HTTP GET request 402 to the wireless router 108. At block 712, the content streaming device 104 may receive a web resource 404 from the wireless router 108. At block 714, the content streaming device 104 may determine whether the web resource 404 received from the wireless router 108 contains the sequence of known characters. If the content streaming device 104 determines that the received resource 404 is the requested web page 404 based on the received resource 404 including the sequence of characters, the content streaming device 104 may confirm that it has been successfully authenticated on the wireless network and may, at block 718, exit out of the captive portal application 122. Upon exiting out of the captive portal application, a default home screen of the content streaming device 104 may be rendered on the display of the display device 102. On the other hand, if the content streaming device 104 determines that the received resource 404 does include the known sequence of characters, the content streaming device 104 may determine that it has not been successfully authenticated and may, at block 716, continue running the captive portal application 122 to permit subsequent authentication attempts.

Illustrative Device Architecture

Figure 8:
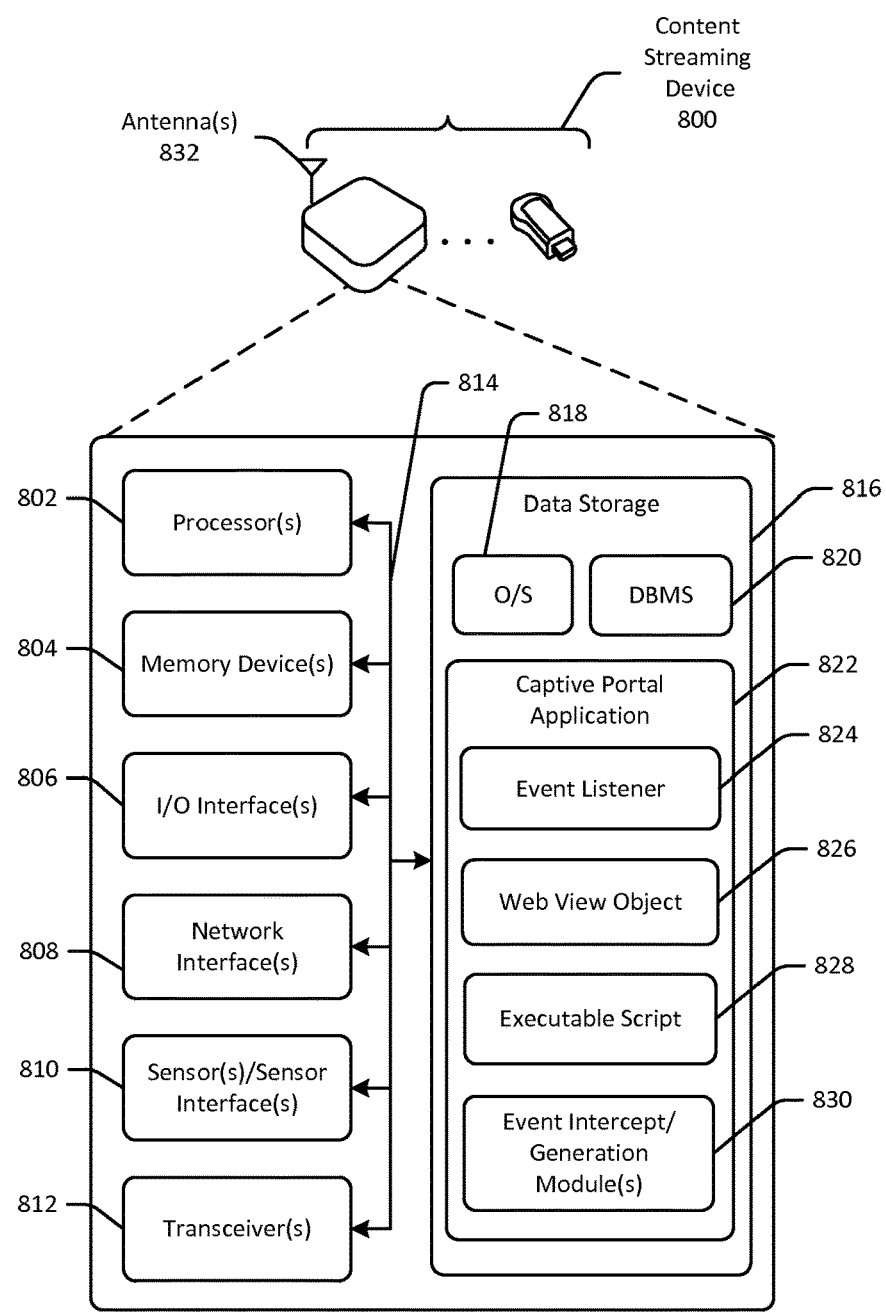
FIG. 8 is a schematic diagram of an illustrative device architecture in accordance with one or more example embodiments of the disclosure.

FIG. 8 is a schematic diagram of an illustrative device architecture in accordance with one or more example embodiments of the disclosure. The content streaming device 800 may be any suitable device for streaming digital content from a remote server. The content streaming device may also store digital content in local data storage on the device. Data stored locally on the device may be streaming content that is buffered or may include content that is stored non-transiently on the device 800.

In an illustrative configuration, the device 800 may include one or more processors (processor(s)) 802, one or more memory devices 804 (generically referred to herein as memory 804), one or more input/output ("I/O") interface(s) 806, one or more network interfaces 808, one or more sensors or sensor interfaces 810, one or more transceivers 812, and data storage 816. The device 800 may further include one or more buses 814 that functionally couple various components of the device 800. The device 800 may further include one or more antennas 832 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 814 may include at least one of a system bus, a memory bus, an address bus, or a message bus, and may permit exchange of information (e.g., data (including computer-executable code), signaling, etc.) between various components of the device 800. The bus(es) 814 may include, without limitation, a memory bus or a memory controller, a peripheral bus, an accelerated graphics port, and so forth. The bus(es) 814 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the device 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 816 may include removable storage and/or non-removable storage including, but not limited to, magnetic storage, optical disk storage, and/or tape storage. The data storage 816 may provide non-volatile storage of computer-executable instructions and other data. The memory 804 and the data storage 816, removable and/or non-removable, are examples of computer-readable storage media (CRSM) as that term is used herein.

The data storage 816 may store computer-executable code, instructions, or the like that may be loadable into the memory 804 and executable by the processor(s) 802 to cause the processor(s) 802 to perform or initiate various operations. The data storage 816 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 816 for non-volatile storage.

More specifically, the data storage 816 may store one or more operating systems (O/S) 818; one or more database management systems (DBMS) 820; and one or more program modules, applications, engines, computer-executable code, scripts, or the like such as, for example, a captive portal application 822, an event listener 824, a web view object 826, executable script 828, and one or more event intercept/generation modules 830. While the event listener 824, the web view object 826, the executable script 828, and the event intercept/generation module(s) 830 are depicted as forming part of the captive portal application 822, it should be appreciated that any of the components depicted as being stored in data storage 816 may be independent modules configured to interact with one another. Any of the components depicted as being stored in data storage 816 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 816 may support functionality described in reference to correspondingly named components earlier in this disclosure. The event intercept/generation module(s) 830 may include computer-executable instructions, code, or the like that responsive to execution by one or more of the processor(s) 802 may cause any of the operations of method 600 to be performed.

The data storage 816 may further store various types of data utilized by components of the device 800. Any data stored in the data storage 816 may be loaded into the memory 804 for use by the processor(s) 802 in executing computer-executable code. In addition, any data depicted as being stored in the data storage 816 may potentially be stored in one or more datastores (not shown in FIG. 8) and may be accessed via the DBMS 820 and loaded in the memory 804 for use by the processor(s) 802 in executing computer-executable code. Such datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 802 may be configured to access the memory 804 and execute computer-executable instructions loaded therein. For example, the processor(s) 802 may be configured to execute computer-executable instructions of the various program modules, applications, engines, or the like of the user device 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to other illustrative components depicted as being stored in the data storage 816, the O/S 818 may be loaded from the data storage 816 into the memory 804 and may provide an interface between other application software executing on the device 800 and hardware resources of the device 800. More specifically, the O/S 818 may include a set of computer-executable instructions for managing hardware resources of the device 800 and for providing common services to other application programs (e.g., managing memory allocation among various application programs). In certain example embodiments, the O/S 818 may control execution of one or more of the program modules depicted as being stored in the data storage 816. The O/S 818 may include any operating system now known or which may be developed in the future including, but not limited to, any server operating system, any mainframe operating system, or any other proprietary or non-proprietary operating system.

The DBMS 820 may be loaded into the memory 804 and may support functionality for accessing, retrieving, storing, and/or manipulating data stored in the memory 804 and/or data stored in the data storage 816. The DBMS 820 may use any of a variety of database models (e.g., relational model, object model, etc.) and may support any of a variety of query languages. The DBMS 820 may access data represented in one or more data schemas and stored in any suitable data repository. In certain example embodiments, the DBMS 820 may be any suitable light-weight DBMS optimized for performance on a mobile device.

Referring now to other illustrative components of the device 800, the input/output (I/O) interface(s) 806 may facilitate the receipt of input information by the device 800 from one or more I/O devices as well as the output of information from the device 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(s) 832 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 800 may further include one or more network interfaces 808 via which the device 800 may communicate with any of a variety of other systems, platforms, networks, devices, and so forth. The network interface(s) 808 may enable communication, for example, with the wireless router 108, the host server 112, and/or one or more web servers (e.g., the web server 406) via one or more of the network(s) 110.

The antenna(s) 832 may include any suitable type of antenna depending, for example, on the communications protocols used to transmit or receive signals via the antenna(s) 832. Non-limiting examples of suitable antennas may include directional antennas, non-directional antennas, dipole antennas, folded dipole antennas, patch antennas, multiple-input multiple-output (MIMO) antennas, or the like. The antenna(s) 832 may be communicatively coupled to one or more transceivers 812 or radio components to which or from which signals may be transmitted or received.

As previously described, the antenna(s) 832 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 832 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 832 may be configured to transmit or receive radio frequency signals within any suitable frequency range forming part of the unlicensed portion of the radio spectrum.

The antenna(s) 832 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(s) 832—transmitting or receiving radio frequency (RF) signals in the bandwidth and/or channels corresponding to the communications protocols utilized by the device 800 to communicate with other devices. The transceiver(s) 812 may include hardware, software, and/or firmware for modulating, transmitting, or receiving—potentially in cooperation with any of antenna(s) 832—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the device 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 8 as being stored in the data storage 816 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 800, and/or hosted on other computing device(s) accessible via one or more networks, may be provided to support functionality provided by the program modules, applications, or computer-executable code depicted in FIG. 8 and/or additional or alternate functionality. Further, functionality may be modularized differently such that processing described as being supported collectively by the collection of program modules depicted in FIG. 8 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 7 may be implemented, at least partially, in hardware and/or firmware across any number of devices.

It should further be appreciated that the device 800 may include alternate and/or additional hardware, software, or firmware components beyond those described or depicted without departing from the scope of the disclosure. More particularly, it should be appreciated that software, firmware, or hardware components depicted as forming part of the device 800 are merely illustrative and that some components may not be present or additional components may be provided in various embodiments. While various illustrative program modules have been depicted and described as software modules stored in data storage 816, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 500-700 may be performed by a device having the illustrative configuration depicted in FIG. 8, or more specifically, by one or more engines, program modules, applications, or the like executable on such a device. It should be appreciated, however, that such operations may be implemented in connection with numerous other device configurations.

The operations described and depicted in the illustrative methods of FIGS. 5-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 5-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   generating, by a content streaming device removably coupled to a television, a hypertext transfer protocol (HTTP) request for a first web page containing a sequence of characters;
   sending, by the content streaming device, the HTTP request to a wireless router via a network connection;
   receiving, by the content streaming device, a second web page from the wireless router via the network connection;
   determining, by the content streaming device, that the second web page does not include the sequence of characters;
   determining, by the content streaming device, that the second web page is a captive portal page via which authentication credentials may be received for authenticating the content streaming device with the wireless router;
   generating, by the content streaming device, an event notification indicating that the captive portal page was received;
   detecting, by an event listener of the content streaming device, the event notification;
   launching, by the content streaming device, a captive portal application executable on the content streaming device, the captive portal application including a web view component for rendering web pages on the television;
   embedding, by the captive portal application, an executable script in the captive portal page, wherein embedding the executable script comprises locating an identifier of a first user interface (UI) object within source code of the captive portal page and associating the executable script with the first UI object, wherein the executable script emphasizes an appearance of at least the first UI object;
   rendering, by the captive portal application, the captive portal page on an electronic display using the web view component, wherein rendering the captive portal page comprises rendering the first UI object of the captive portal page using a first number of pixels of the electronic display and rendering a second UI object of the captive portal page;
   executing, by the captive portal application, the executable script to cause a boundary to be rendered around the first UI object when the first UI object is selected;
   determining, by the captive portal application, that the first UI object has been selected;
   causing the boundary to be rendered around the first UI object to display the first UI object more prominently than the second UI object and to indicate that the first UI object has been selected for receiving one or more characters, wherein the first UI object and the boundary are rendered using a second number of pixels of the electronic display, and wherein the second number of pixels is greater than the first number of pixels;
   detecting a first interaction with one of the first UI object and the second UI object; and
   sending data to a content source based at least in part on the first interaction.

2. The method of claim 1, wherein the HTTP request is a first HTTP request and the captive portal page received from the wireless router is a first instance of the captive portal page, the method further comprising:
   generating, by the captive portal application, a second HTTP request for a third web page;
   sending, by the captive portal application, the second HTTP request to the wireless router via the network connection; and
   receiving, by the captive portal application, a second instance of the captive portal page from the wireless router via the network connection, wherein the executable script is embedded in the second instance of the captive portal page and the second instance of the captive portal page is rendered using the web view component.

3. The method of claim 1, wherein embedding the executable script in the captive portal page further comprises calling a function defined on an interface of the web view component, wherein calling the function comprises passing the executable script as a parameter to the function, and wherein executing the executable script comprises locating the identifier of the first UI object in the source code of the captive portal page and associating a style object with the identifier, wherein the style object is representative of the boundary to be rendered around the first UI object when the first UI object is selected.

4. The method of claim 1, further comprising:
   receiving, by the content streaming device, a signal from a remote control device, wherein the signal is indicative of a selection of a button of the remote control device;
   generating, by the content streaming device, an event corresponding to a first device operation associated with selection of the button;
   intercepting, by the captive portal application, the event, wherein intercepting the event comprises passing the event as an input parameter to a function and making a call to the function to prevent the first device operation from being performed; and
   generating, by the captive portal application, an application programming interface to cause a second device operation to be performed, the second device operation comprising navigating from the first UI object to the second UI object.

5. A method, comprising:
   sending, by a device, an HTTP request for a first web page that comprises a sequence of characters;
   receiving a second web page including website content, wherein the second web page does not include the sequence of characters;

associating an executable script with at least a portion of the website content;

detecting, using an event listener, an event notification indicating that the second web page is a captive portal page that requires authentication credentials;

embedding an executable script in the second web page;

causing the website content to be rendered by an electronic display, wherein rendering the website content comprises rendering a first user interface (UI) object using a first number of pixels of the electronic display;

executing the executable script to cause a boundary to be rendered in association with the first UI object to emphasize an appearance of the first UI object so as to indicate that the first UI object is currently selected, wherein the first UI object and the boundary are rendered using a second number of pixels, and wherein the second number of pixels is greater than the first number of pixels;

detecting an interaction with the first UI object; and receiving, by the device, data from one or more content sources.

6. The method of claim 5, further comprising:

launching, based on detection of the event notification, a captive portal application configured to render the captive portal page in a component for rendering web pages.

7. The method of claim 5, wherein the HTTP request is a first HTTP request and the captive portal page is received from a wireless router and is a first instance of the captive portal page, the method further comprising:

generating a second HTTP request for a third web page;

sending the second HTTP request to the wireless router; and receiving a second instance of the captive portal page from the wireless router, wherein the executable script is associated with the second instance of the captive portal page and the second instance of the captive portal page is rendered using a component for rendering web pages.

8. The method of claim 5, wherein rendering the web page on the electronic display using the component further comprises rendering a second UI object, the method further comprising:

determining, by the captive portal application, that the second UI object has been selected; and causing, as a result of execution of the executable script, indicia to be rendered to display the second UI object more prominently than the first UI object and to indicate that the second UI object has been selected and that the first UI object has been de-selected.

9. The method of claim 5, wherein rendering the web page on the electronic display further comprises rendering a second UI object, the method further comprising:

receiving a signal from a remote control device, wherein the signal is indicative of a selection of a button of the remote control device;

generating an event corresponding to a first device operation associated with selection of the button;

detecting the event; and generating, by the captive portal application, an application programming interface to cause a second device operation to be performed instead of the first device operation, the second device operation comprising navigating from the first UI object to the second UI object.

10. The method of claim 5, further comprising:

rendering a graphical indicator at a first location of the second web page, wherein the graphical indicator enables navigation to any location of the second web page rendered on the electronic display;

receiving a signal from a remote control device, wherein the signal is indicative of a selection of a button of the remote control device;

generating a first event corresponding to a first device operation associated with selection of the button;

receiving the first event to prevent the first device operation from being performed;

generating a second event corresponding to a second device operation; and performing the second device operation during receipt of the signal from the remote control device, wherein performing the second device operation comprises continuously rendering the graphical indicator at a plurality of additional locations of the second web page in a direction corresponding to the button.

11. The method of claim 5, further comprising:

receiving user authentication credentials via the captive portal page;

generating an authentication request;

sending the authentication request to a wireless router;

receiving an authentication response from the wireless router, wherein the authentication response comprises a landing page indicating that the wireless router has authenticated the device;

receiving a third web page from the wireless router;

determining, by the device, that the third web page includes the sequence of characters; and exiting, by the device, the captive portal application.

12. A device, comprising:

at least one memory storing computer-executable instructions; and at least one processor operatively coupled to the at least one memory and configured to access the at least one memory and execute the computer-executable instructions to:

send an HTTP request for a first web page that comprises a sequence of characters;

receive a second web page from a wireless router, wherein the second web page does not include the sequence of characters;

associate an executable script with the web page;

detect, using an event listener, an event notification indicating that the second web page is a captive portal page that requires authentication credentials;

embed an executable script in the second web page;

cause the website content to be rendered by an electronic display, wherein rendering the website content comprises rendering a first user interface (UI) object using a first number of pixels of the electronic display;

execute the executable script to cause a boundary to be rendered in association with the first UI object to emphasize an appearance of the first UI object so as to indicate that the first UI object is currently selected, wherein the first UI object and the boundary are rendered using a second number of pixels, and wherein the second number of pixels is greater than the first number of pixels;

detect an interaction with the first UI object; and receive data from one or more content sources.

13. The device of claim 12, wherein the at least one processor is further configured to execute the computer-executable instructions to:

launch a captive portal application based on detection of the event notification, wherein the captive portal application is configured to render the captive portal page in a component for rendering web pages.

14. The device of claim 12, wherein the HTTP request is a first HTTP request and the captive portal page received from a wireless router is a first instance of the captive portal page, and wherein the at least one processor is further configured to execute the computer-executable instructions to:

generate a second HTTP request for a third web page;
send the second HTTP request to the wireless router; and
receive a second instance of the captive portal page from the wireless router, wherein the executable script is associated with the second instance of the captive portal page and the second instance of the captive portal page is rendered using a component for rendering web pages.

15. The device of claim 12, wherein rendering the web page on the electronic display using the component further comprises rendering a second UI object, and wherein the at least one processor is further configured to execute the computer-executable instructions to:

determine that the second UI object has been selected; and
cause, as a result of execution of the executable script, indicia to be rendered to display the second UI object more prominently than the first UI object and to indicate that the second UI object has been selected and that the first UI object has been de-selected.

16. The device of claim 12, wherein rendering the web page on the electronic display further comprises rendering a second UI object, and wherein the at least one processor is further configured to execute the computer-executable instructions to:

receive a signal from a remote control device, wherein the signal is indicative of a selection of a button of the remote control device; and
generate a first event corresponding to a first device operation associated with selection of the button;
receive the first event to prevent the first device operation from being performed; and
generate an application programming interface to cause a second device operation to be performed, the second device operation comprising navigating from the first UI object to the second UI object.

17. The device of claim 12, wherein the at least one processor is further configured to execute the computer-executable instructions to:

receive a signal from a remote control device, wherein the signal is indicative of a selection of a button of the remote control device;
generate a first event corresponding to a first device operation associated with selection of the button;
render a graphical indicator at a first location of the second web page, wherein the graphical indicator enables navigation to any location of the second web page rendered on the electronic display;
receive the first event to prevent the first device operation from being performed;
generate a second event corresponding to a second device operation; and
perform the second device operation during receipt of the signal from the remote control device, wherein performing the second device operation comprises continuously rendering the graphical indicator at a plurality of additional locations of the captive portal page in a direction corresponding to the button.

18. The device of claim 12, wherein the at least one processor is further configured to execute the computer-executable instructions to:

receive user authentication credentials via the captive portal page;
generate an authentication request;
send the authentication request to the wireless router;
receive an authentication response from the wireless router indicating that the user authentication credentials have been authenticated;
receive a third web page from the wireless router;
determine that the third web page includes the sequence of characters; and
exit the captive portal application.

* * * * *